(12) United States Patent
Neufeld et al.

(10) Patent No.: US 9,834,126 B2
(45) Date of Patent: Dec. 5, 2017

(54) SEED TENDER WITH SPINDLE AND BRAKE ASSEMBLY FOR CONVEYOR ROTATION

(71) Applicant: MERIDIAN MANUFACTURING, INC., Winnipeg (CA)

(72) Inventors: Juan Neufeld, Winkler (CA); Jeffrey Paul Grindle, Carroll, IA (US)

(73) Assignee: MERIDIAN MANUFACTURING, INC., Winnipeg, MB (CA)

( * ) Notice: Subject to any disclaimer, the term of this patent is extended or adjusted under 35 U.S.C. 154(b) by 30 days.

(21) Appl. No.: 14/616,193

(22) Filed: Feb. 6, 2015

(65) Prior Publication Data

US 2016/0229328 A1     Aug. 11, 2016

(51) Int. Cl.
  *B60P 1/42*     (2006.01)
  *A01C 15/00*   (2006.01)
  *B65G 41/00*   (2006.01)

(52) U.S. Cl.
  CPC .............. *B60P 1/42* (2013.01); *A01C 15/003* (2013.01); *B65G 41/002* (2013.01)

(58) Field of Classification Search
  CPC ...... B65G 65/42; B65G 65/40; B65G 65/425; B65G 41/002; B65G 41/005; B60P 1/36; B60P 1/40; B60P 1/42; A01C 15/003
  USPC ......... 414/301, 299, 302; 198/312, 315, 317
  See application file for complete search history.

(56) References Cited

U.S. PATENT DOCUMENTS

| | | | | |
|---|---|---|---|---|
| 1,327,469 | A * | 1/1920 | Hartley ................... | A01F 12/50 110/110 |
| 7,500,817 | B2 * | 3/2009 | Furrer ................... | A01C 15/003 198/311 |
| 8,221,047 | B2 * | 7/2012 | Petersen .............. | A01C 15/003 198/312 |
| 8,944,239 | B2 * | 2/2015 | Campbell .............. | B65G 67/08 198/588 |
| 2014/0227068 | A1 * | 8/2014 | Neufeld .................... | B60P 1/36 414/304 |

* cited by examiner

*Primary Examiner* — Mark C Hageman

(74) *Attorney, Agent, or Firm* — McKee, Voorhees & Sease, PLC

(57) ABSTRACT

A belt or auger conveyor is rotatably mounted on the frame of a seed cart or tender. The conveyor is mounted on a bracket, which in turn is mounted on the housing of a brake assembly. The brake assembly is rotatably mounted on a spindle fixed to a carriage, which is rollably mounted on tracks of the frame. The carriage allows the inlet of the roller to be longitudinally positioned for receiving seed or grain from a hopper or bulk container, while the spindle allows the outlet end of the conveyor to be rotated approximately 180° for positioning above a planter, truck or other receptacle. The brake assembly allows the rotational position of the conveyor to be infinitely adjusted without limitation to preset positions.

14 Claims, 4 Drawing Sheets

SEED TENDER WITH SPINDLE AND BRAKE ASSEMBLY FOR CONVEYOR ROTATION

FIELD OF THE INVENTION

The invention relates to an improved agricultural seed cart having a belt and auger conveyor which is infinitely adjustable along a 180° rotational path by using a spindle and brake assembly.

BACKGROUND OF THE INVENTION

Seed cards and seed tenders are well-known in the agricultural industry for transporting seed and grain to and from the field. There are two primary styles of seed carts and seed tenders, both of which have a container for seeds. A bulk seed tender typically includes a trailer with a framework for supporting one or more bulk seed boxes or bags. The bulk seed boxes/bags are filled by the seed supplier, mounted on the trailer frame, and transported to the field to fill seed planters in the Spring. A seed cart includes a trailer or wheeled frame with a larger seed hopper supported by legs on the trailer or frame. While the bulk seed boxes/bags are not typically used in the Fall for harvest, a seed cart with the hopper can be used in the Spring to fill planters with seed, and it can be used in the Fall to receive seed from a combine.

Both the bulk seed box or bag and the seed cart hopper have seed outlets in communication with a chute to direct the seed into a conveyor, which carries the seed to a planter or carries the harvested grain for discharge into a truck or other container. The conveyors are either a belt-type conveyor or an auger-type conveyor.

The belt or auger conveyor has an inlet end positioned beneath the seed container and is inclined upwardly to an outlet for discharging the seed into planters, trucks, or other carriers. The lower end of the conveyor is typically pivotally mounted on a plate so that the conveyor can be rotated up to 180° to position the conveyor outlet at a desired location. The conventional prior art structure for permitting such rotation of the conveyor has a limited number of preset positions in which the conveyor can be locked. For example, a rotational plate may have a plurality of holes into which a pin drops to fix the conveyor in the set position. However, for improved accuracy, it would be beneficial to be able to position the conveyor anywhere along the rotational arc, without limitation to preset angular positions.

Accordingly, a primary objective of the present invention is the provision of a seed cart or tender having a rotatable conveyor which is infinitely adjustable along a 180° rotational path.

Another objective of the present invention is the provision of a seed cart or tender which rotates the conveyor using a spindle and brake assembly to permit the conveyor to be positioned in an infinite number of positions between 0° and 180°.

A further objective of the present invention is the provision of a rotatable conveyor on a seed cart or tender which can be locked in any position along a 180° arc without limitation to preset positions.

Another objective of the present invention is the provision of a seed cart and seed tender having a rotatable conveyor which is economical to manufacturer, and durable and safe in use.

These and other objectives will become apparent from the following description of the invention.

SUMMARY OF THE INVENTION

The seed cart and seed tender of the present invention includes a frame to support a hopper or, alternatively, one or more bulk seed containers. The seed cart or tender includes a conveyor which is rotationally mounted upon the frame of the cart or tender for pivotal movement approximately 180° from the front to the rear of the cart or tender. A mounting assembly includes a carriage rollably supported in a track extending longitudinally on the frame for movement of the carriage fore and aft. A spindle is fixed to the carriage for rotational support of a brake assembly. A bracket is attached to a housing of the brake assembly, with the conveyor being mounted on the bracket. The brake assembly, bracket and conveyor can be rotated approximately 180° on the spindle so as to position the outlet of the conveyor anywhere along the rotational arc. The brake assembly includes an electrical or mechanical brake so as to lock the conveyor against rotation in any selected position between 0° and 180°. The brake allows the conveyor to be infinitely adjustable along the rotational path, without limit to any preset positions.

The bracket inclines the conveyor upwardly from the inlet end to the outlet end.

DETAILED DESCRIPTION OF THE PREFERRED EMBODIMENTS

Figure 1:
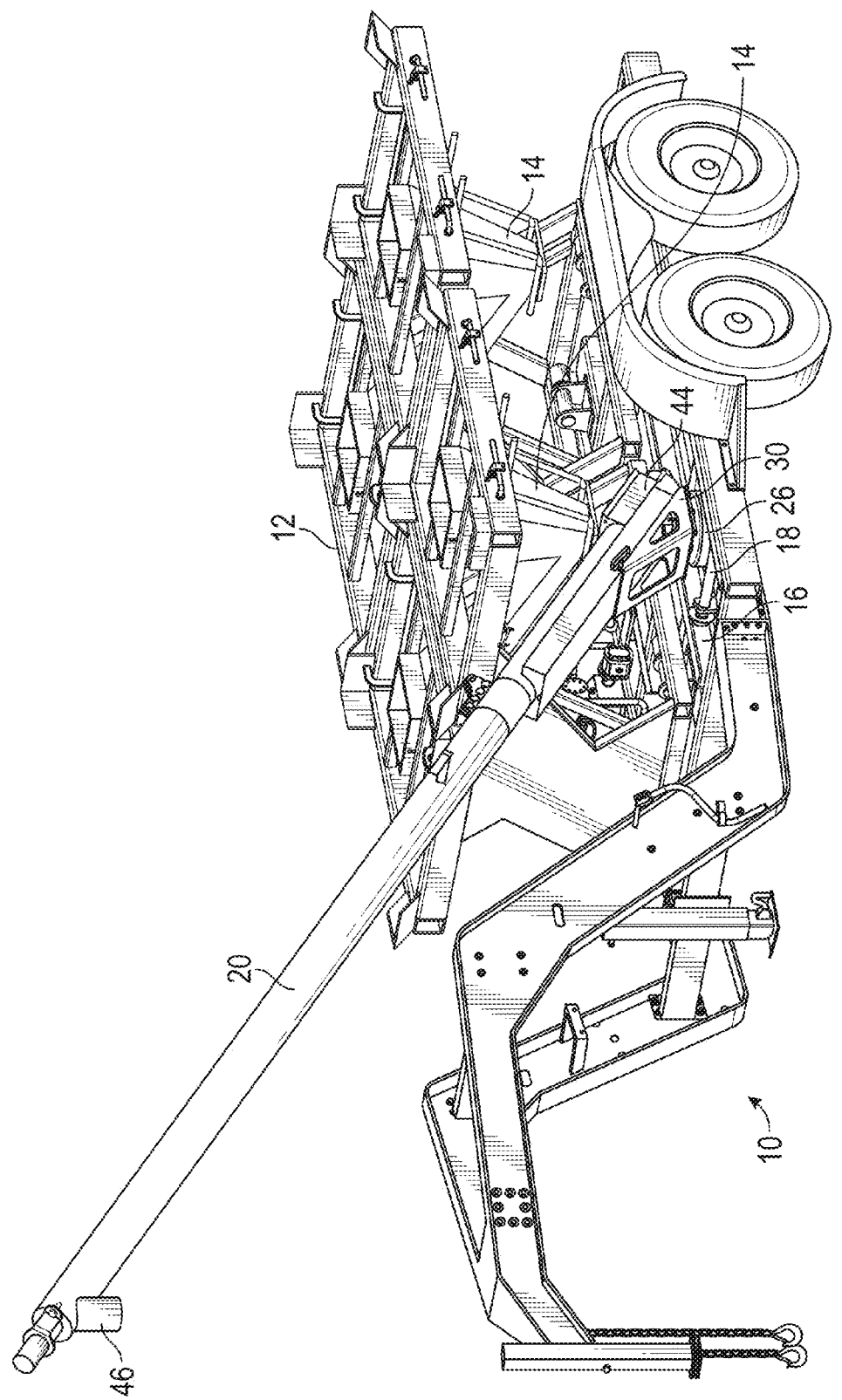
FIG. 1 is a perspective view of a seed trailer with the interchangeable conveyors according to the present invention.
Figure 2:
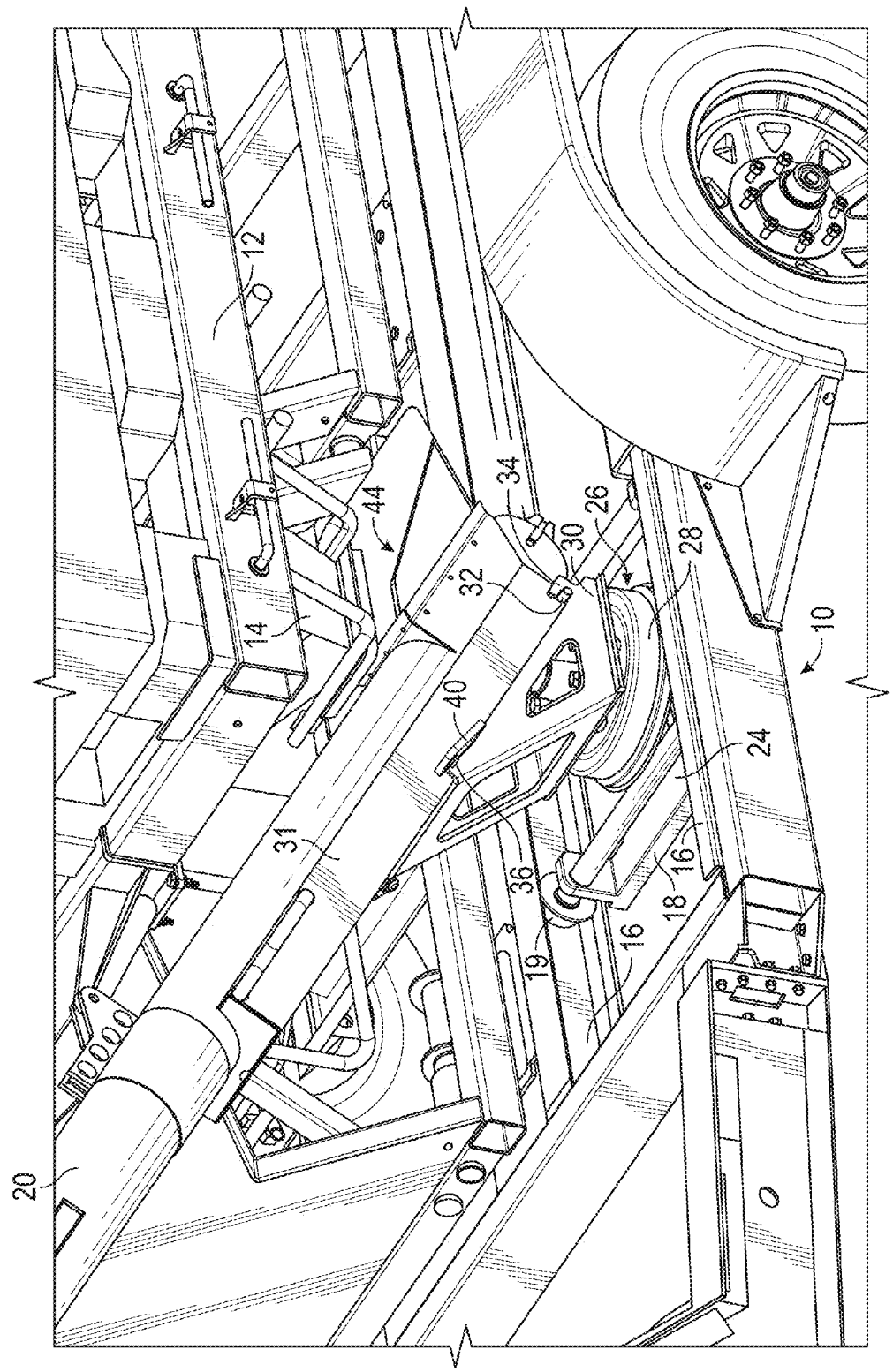
FIG. 2 is an enlarged, partial perspective view of the seed trailer having the interchangeable conveyors according to the present invention.

In FIG. 1, a bulk seed trailer is generally designated by the reference numeral 10. The trailer includes a frame 12 adapted to support bulk seed container boxes (not shown). The frame 12 shown in FIG. 1 can receive 1-4 bulk seed containers, though it is understood that the frame may be sized and configured to support any number of bulk seed container boxes. The bulk seed container boxes each include a bottom outlet for discharging seed into chutes 14 on the frame 12. The frame 12 also includes a track 16 with opposite sides formed with C-shaped channels. A carriage 18 with wheels or rollers 19 is mounted in the track 16 for rolling movement along the track.

The present invention is directed towards a pair of conveyors 20 which can be interchangeably mounted on the trailer 10. One of the conveyors 20 is a belt conveyor and the other is an auger conveyor. While the operating mechanics of the belt and auger conveyors are different, the assembly for mounting and dismounting the conveyors onto the trailer 10 is similar for both conveyors.

Figure 3:
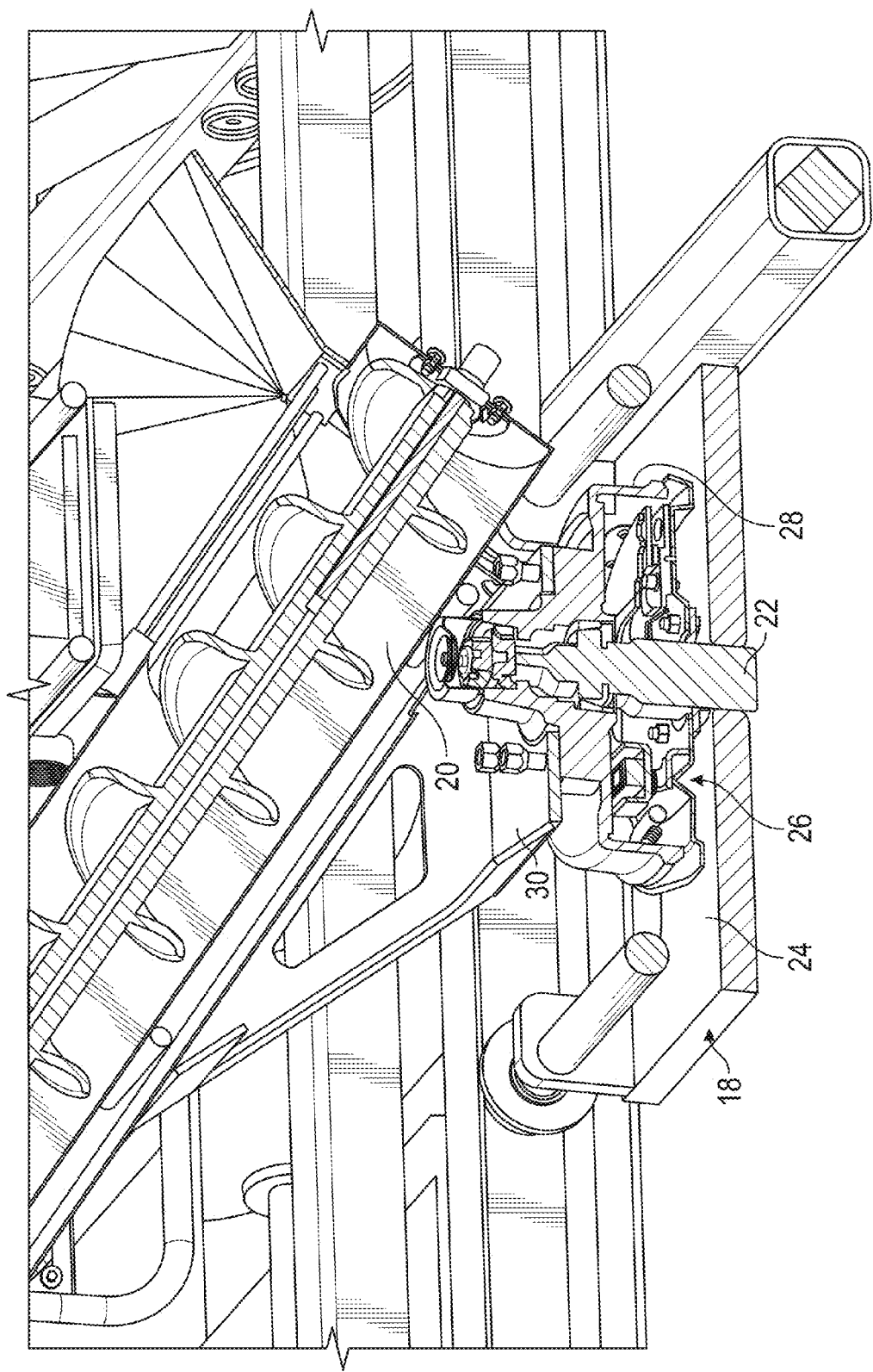
FIG. 3 is a sectional view of the conveyor mounting bracket and rotation assembly.
Figure 4:
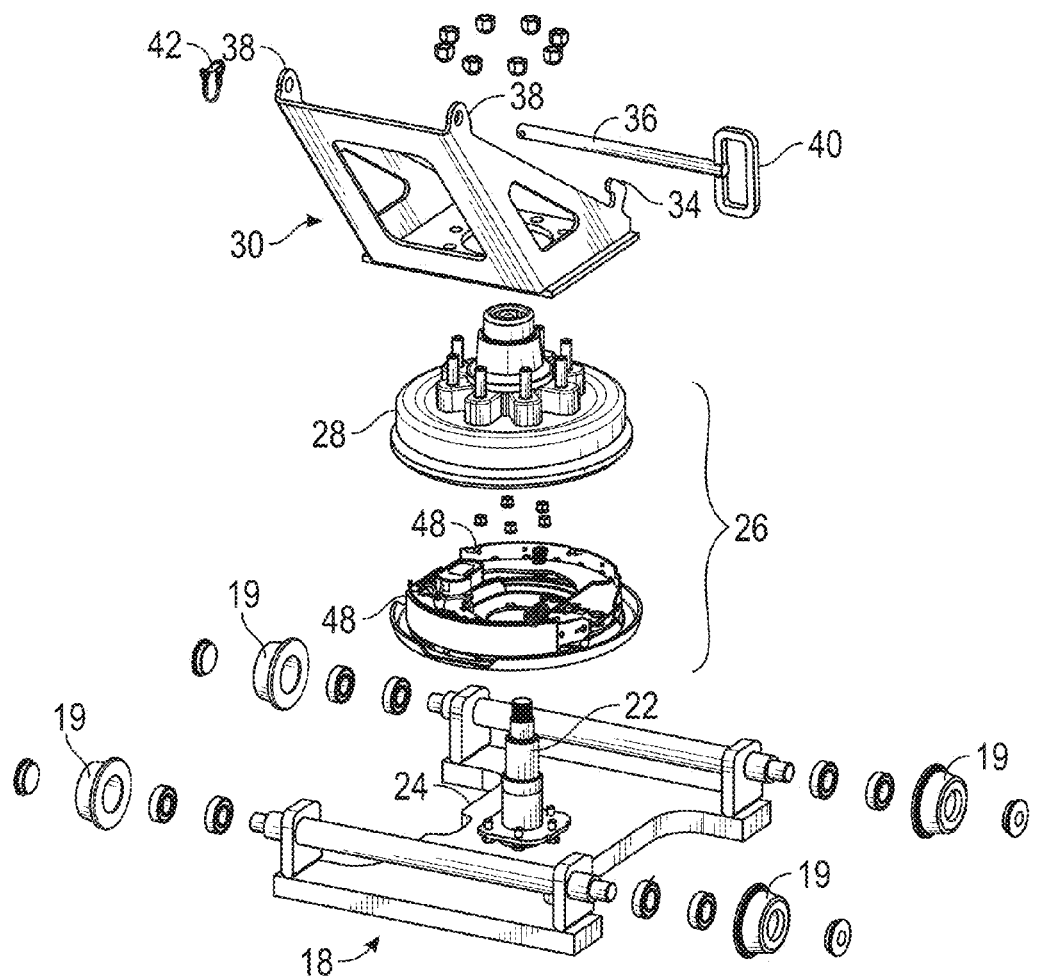
FIG. 4 is an exploded view of the bracket, spindle, and brake assembly.

More particularly, a spindle 22 is fixed to a plate 24 of the carriage 18, as seen in FIG. 3. A brake assembly 26 having an upper housing or drum 28 is rotatably mounted on the spindle 22. A mounting bracket 30 is bolted or otherwise secured to the housing 28 of the brake assembly 26 for rotation therewith.

The belt and auger conveyors 20 can be selectively exchanged on the bracket 30, depending upon the farmer's needs. More particularly, the lower end of each conveyor includes a pair of outwardly extending posts or stub shafts 32 which are slidably received within a pair of upstanding hooks 34 on opposite sides of the bracket 30. Thus, the hooks 34 retentively engage the posts 32. An elongated pin 36 extends through upstanding ears 38 and through the conveyor or housing or base 31 so as to further secure the conveyor 20 to the bracket 30. The pin 36 may include a handle 40 on one end for easy gripping and a releasable lock mechanism 42 on the opposite end to prevent accidental removal of the pin 36 from the conveyor 20 and the bracket 30.

The bracket 30 supports the conveyor 20 in an upwardly inclined, cantilevered position. The carriage 18 can be rolled along the track 16 so as to position the inlet 44 of the belt or auger conveyor beneath one of the chutes 14 to receive seed from the bulk seed container box or the hopper. The conveyor 20 can also be rotated on the spindle 22 via the bracket 30 and brake assembly 26 connection so that the outlet 46 of the conveyor can be positioned along a path extending substantially 180° between the front of the trailer 10 and the rear of the trailer 10. The brake assembly 26 includes electrically or mechanically actuated brake shoes 48 to lock the conveyor 20 in a selected rotational position. The rotational position is infinitely adjustable from approximately 0°-180°, as opposed to being limited to a plurality of preset angular orientations.

In use, a farmer can selectively interchange the belt and auger conveyors, as needed in the field. For example, a belt conveyor can be used in the Spring to deliver seed to planters, while an auger conveyor can be used in the Fall to quickly convey grain from the seed cart hopper to a truck or other container. Exchanging one conveyor for the other simply requires the disconnection of hydraulic and electrical couplings from the conveyor, and then pulling the pin 36 from the conveyor base 31 and bracket 30. The conveyor can then be manually slid upwardly so as to disengage the posts 32 from the hooks 34. The operation is reversed to mount the alternative conveyor, which is slid downwardly along the bracket 30 until the posts 32 are received in the hooks 34. Then the pin 36 is a reinserted through the bracket ears 38 and the conveyor base 31. Then the hydraulic and electrical lines can be reconnected to the substituted conveyor for operation.

Once the selected belt or auger conveyor is mounted to the bracket, and hydraulic and electrical lines are attached, the cart or tender is normally towed behind a tractor or other vehicle with the conveyor extending forwardly, generally parallel with the longitudinal axis of the trailer 10. Once the trailer is in position for unloading seed from the hopper or bulk seed box or bag into a planter, truck, or other container, the brake on the brake assembly 26 can be released so that the conveyor 20 can be pivoted about the axis of the spindle 22 until the conveyor outlet 46 is positioned over the planter, truck, or container to receive the seed or grain. The brake can then be engaged to fix the conveyor 20 against rotation. Since the spindle 22 and brake assembly 26 do not have any preset rotational lock positions, the conveyor can be infinitely adjusted along the rotational path, and quickly and easily moved and set to any desired position between approximately 0° and 180°.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A seed cart, comprising:
   a trailer;
   a seed container mounted on the trailer and having a seed outlet;
   a conveyor mounted on the trailer and having an upper end with an outlet and a lower end with an inlet positioned beneath the seed outlet; and
   an upstanding spindle fixed to the trailer within a perimeter of the trailer;
   a brake rotatably mounted on top of the spindle;
   the conveyor being mounted at the lower end on top of the brake such that the spindle is beneath the seed outlet; and
   the brake being actuated to retain the conveyor in a selected rotated position.

2. The seed cart of claim 1 wherein the conveyor is pivotal substantially 180° on the spindle.

3. The seed cart of claim 1 wherein the brake, when engaged, locks the conveyor infinitely along a 180° angle.

4. The seed cart of claim 1 wherein the brake is electric.

5. The seed cart of claim 1 wherein the brake is mechanical.

6. The seed cart of claim 1 wherein in the brake is between the spindle and the conveyor.

7. The seed cart of claim 1 wherein the brake includes a drum and at least one brake shoe.

8. The seed cart of claim 1 wherein the conveyor inlet is directly above the brake.

9. The seed cart of claim 1 wherein the conveyor inlet is over the spindle.

10. A seed cart, comprising:
    a frame;
    a seed container on the frame;
    a conveyor pivotally mounted on the frame and having an inlet positioned at all times within a perimeter of the frame and an outlet; and
    a spindle fixed to the frame;
    a brake on the spindle for rotation about the spindle;
    the conveyor being mounted on top of the brake;
    the spindle defining a pivot axis for the conveyor beneath the conveyor inlet, and
    the conveyor being infinitely adjustable along a 180° range of motion without pre-set lock points between opposite ends of the range of motion.

11. The seed cart of claim 10 wherein the brake is electric.

12. The seed cart of claim 10 wherein the brake is mechanical.

13. The seed cart of claim 10 wherein the brake is between the spindle and the conveyor.

14. The seed cart of claim 10 wherein the brake includes a drum and at least one brake shoe.

* * * * *